United States Patent

[11] 3,607,018

| [72] | Inventors | William P. Moore<br>Chester;<br>William C. Sierichs, Hopewell, both of Va. |
|---|---|---|
| [21] | Appl. No. | 742,096 |
| [22] | Filed | July 2, 1968 |
| [45] | Patented | Sept. 21, 1971 |
| [73] | Assignee | Allied Chemical Corporation<br>New York, N.Y. |

[54] WATER-SOLUBLE POLYPHOSPHATES
2 Claims, 3 Drawing Figs.

[52] U.S. Cl. .................................. 23/106, 23/107
[51] Int. Cl. ............................................ C01b 25/30
[50] Field of Search .................................. 23/106, 106 A, 107

[56] References Cited
UNITED STATES PATENTS

| 1,456,850 | 5/1923 | Hazen et al. ................ | 23/107 |
| 1,925,644 | 9/1933 | Pristoupil ..................... | 23/106 |
| 3,081,150 | 3/1963 | Beltz et al. ................... | 23/106 A |
| 3,113,858 | 12/1963 | Slack et al. .................. | 23/107 X |
| 3,414,375 | 12/1968 | Leroy et al. .................. | 23/106 |
| 3,285,731 | 11/1966 | Salvtsky et al. .............. | 71/33 |

OTHER REFERENCES

Slack (editor), Phosphoric Acid, vol. 1, part 1, pp 43–44 (Dekker Inc. April 5, 1968)

Primary Examiner—Oscar R. Vertiz
Assistant Examiner—Charles B. Rodman
Attorneys—John J. Lipari and Charles E. Miller, Fred L. Kelley ABSTRACT: A mixture of alkali metal chloride and a reactive excess of phosphoric acid is heated in finely divided form at a temperature of about 250 to 400° C. for a period of time of about 1 to 100 seconds. The resulting alkali metal polyphosphates are separated from byproduct hydrogen chloride and quickly cooled to a temperature of less than about 80° C. The alkali metal polyphosphates are water-soluble and free of chloride ion and alkali metal metaphosphates.

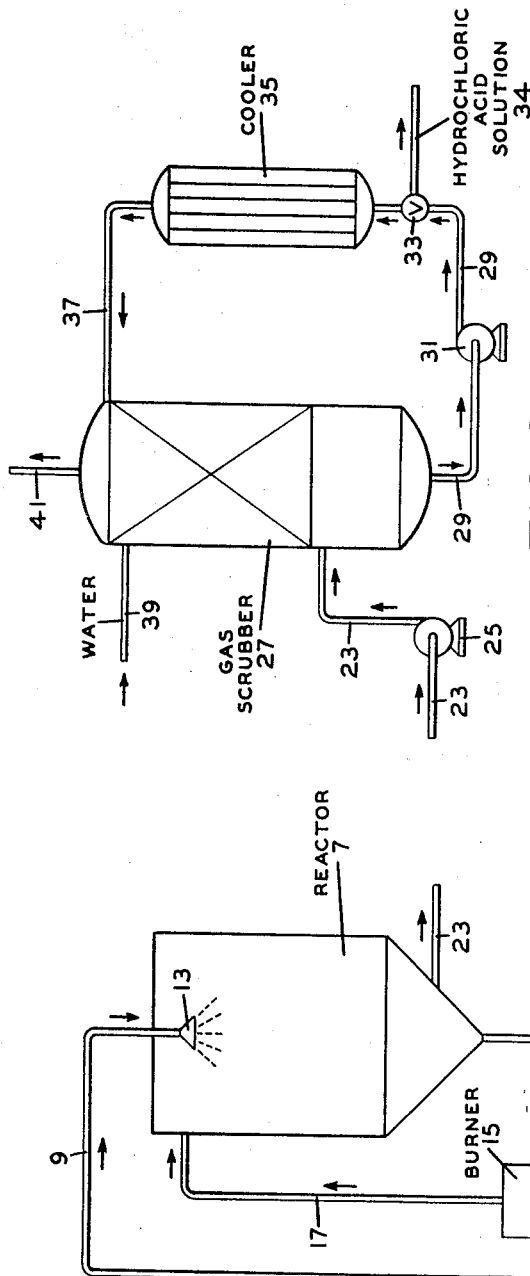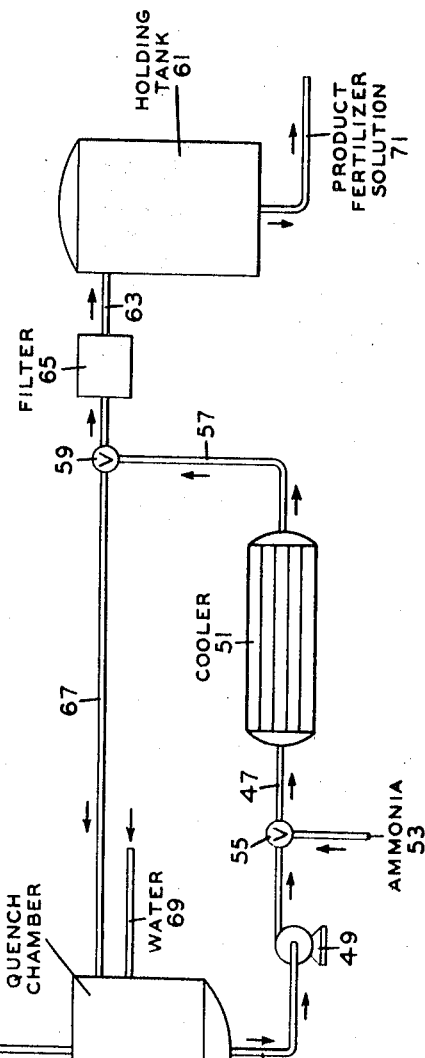

WATER-SOLUBLE POLYPHOSPHATES

This invention relates to polyphosphate salts. More particularly it relates to the production of water-soluble alkali metal polyphosphates from orthophosphoric acid (hereinafter "phosphoric acid") and alkali metal chlorides.

Polyphosphate salts are useful soil fertilizers because of their unusually high plant food content. Polyphosphate salts of relatively low molecular weight are generally water-soluble and therefore particularly useful in formulating liquid fertilizers. Water-soluble alkali metal polyphosphates are especially preferred in formulating high-analysis liquid fertilizer compositions because the water-solubility of such alkali metal polyphosphates is generally greater on a weight basis than that of corresponding orthophosphate salts (hereinafter "phosphate salts"). Furthermore, alkali metal polyphosphates have the unusual ability to act as sequestering agents for water-insoluble minor and micronutrients such as zinc and copper compounds, thereby making such compounds available to plants. Also, water-soluble polyphosphate salts are known to have greater mobility in soils than phosphate salts and are not "tied up" in calcareous or acid soils as are phosphate salts. Consequently, water-soluble potassium polyphosphates are more readily available to plants as nutrients.

In the production of alkali metal polyphosphates, it would be desirable to employ an alkali metal chloride and phosphoric acid, both of which materials are abundant and inexpensive. It would also be desirable to react an alkali metal chloride and phosphoric acid in such a manner that the polyphosphate product is obtained in high yield and uncontaminated with chloride ion (which is undesirable in certain fertilizer applications) and also free of alkali metal metaphosphates (which are water-insoluble and consequently of limited commercial value as plant food).

Accordingly, it is an object of the present invention to provide a process for the production of water-soluble alkali metal polyphosphates from alkali metal chlorides and phosphoric acid.

Another object is to provide a process for the production of water-soluble alkali metal polyphosphates from alkali metal chlorides and phosphoric acid, which polyphosphates are obtained in high yield and essentially free of chloride ion and alkali metal metaphosphates.

Yet another object is to provide a process for the conversion of mixtures of alkali metal chloride and phosphoric acid into high-analysis liquid fertilizer solutions of alkali metal polyphosphates, which solutions are essentially free of chloride ion and alkali metal metaphosphates.

These and other objects, as well as a fuller understanding of the present invention can be had by reference to the following detailed description and claims.

According to the present invention, phosphoric acid and an alkali metal chloride or mixture of alkali metal chlorides are blended together at ambient temperature to form an intimate mixture, preferably a slurry, so that no substantial reaction occurs. This intimate mixture is sprayed in the form of fine particles into a zone of high temperature. The alkali metal chloride reacts with phosphoric acid, resulting in the evolution of hydrogen chloride. Dehydration of the intermediate alkali metal salt of phosphoric acid produces water-soluble alkali metal polyphosphates which are immediately quenched in a suitable medium. It is a feature of the present invention that process conditions have been discovered which ensure complete reaction of alkali metal chloride while at the same time avoiding dehydration of the alkali metal polyphosphates to metaphosphates.

In further accordance with the present invention, the alkali metal chloride and phosphoric acid are blended together to provide a mixture (preferably a slurry) in which there is present a reactive excess of phosphoric acid relative to the alkali metal chloride. Desirably, the mole ratio of alkali metal chloride (now and hereinafter expressed in terms of alkali metal oxide, $M_2O$, wherein M generically represents an alkali metal atom) to phosphoric acid (now and hereinafter expressed in terms of phosphorus pentoxide, $P_2O_5$) is between about 0.75 and about 1.5, and preferably between about 0.75 and about 1.2.

Alkali metal chlorides suitable for use in the present invention include, e.g., sodium chloride and potassium chloride. The especial importance of potassium ion as a plant nutrient makes the present process particularly attractive from the point of view of using potassium chloride as the alkali metal chloride. Accordingly, the process of the present invention will be hereinafter described with particular reference to potassium chloride. It is understood however, that other alkali metal chlorides, e.g., sodium chloride, can also be used under similar conditions.

In accordance with the aforementioned requirements regarding proportions of reactants, it is desirable to mix potassium chloride and phosphoric acid to form a slurry in which the weight ratio of $K_2O$ to $P_2O_5$ is between about 0.5 and about 1.0, and preferably between about 0.5 and about 0.8.

Generally, the purity and mesh size of the potassium chloride is not critical to the success of the present process. In this connection however, pure, finely divided potassium chloride is preferred; "fertilizer grade" potassium chloride in standard pulverized form is especially preferred for economic reasons.

Generally phosphoric acid suitable for use in the present process can be either of the "wet-process" or "furnace" type, having a $P_2O_5$ content of between about 35 percent by weight and about 70 percent by weight. It is a feature of the present invention that, whereas the impurities normally present in wet-process phosphoric acid are troublesome in prior art procedures because they form insoluble, sticky products which rapidly coat heat-transfer surfaces, the present process permits trouble-free use of such phosphoric acid because the heat required to effect the reaction is transferred directly to the reactants without the use of heat-transfer surfaces. The quenching step also involves a direct transfer of heat away from the reaction product without the use of solid heat-transfer surfaces. These advantageous features of the present process will be elaborated hereinbelow. Preferably, however, relatively pure phosphoric acid is used in the present process. Especially preferred is "solvent-extracted" wet-process phosphoric acid having a $P_2O_5$ content of between about 50 percent by weight and about 60 percent by weight. "Solvent-extracted" wet-process phosphoric acid is prepared by decomposing phosphate rock with mineral acid and extracting the liberated phosphoric acid with a solvent capable of dissolving same. Phosphoric acid is very soluble in many organic solvents. Solvents usable with particular advantage are water-immiscible lower aliphatic alcohols, especially butanols, pentanols and mixtures thereof, also ketones and other polar solvents. The solvent phase is then separated from the aqueous phase, and phosphoric acid is recovered from the solvent phase. Phosphoric acid preferred for use in the present invention is further characterized by containing less than about 5 percent by weight of metal-containing impurities (now and hereinafter expressed in terms of metal oxide). Preferably, the metal-containing impurities amount to less than about 3 percent by weight of the phosphoric acid feed.

After blending at ambient temperature (herein defined as any temperature, preferably normal room temperature, at which potassium chloride and phosphoric acid can be combined to form a slurry without causing any substantial reaction) the resulting intimate mixture of potassium chloride and phosphoric acid is injected in finely and uniformly divided (i.e., particulate) form into a region of elevated temperature, which temperature is sufficiently high to cause reaction between the potassium chloride and phosphoric acid. The reaction temperature is desirably between about 250° C. and about 400° C., and preferably between about 300° C. and about 350° C. The particle size (i.e., average diameter) characterizing the injected mixture is desirably between about 1 micrometer and about 1,000 micrometers, and preferably between about 20 micrometers and about 100 micrometers.

The total length of time (hereinafter "residence time") during which the injected mixture is exposed to the aforementioned elevated temperature is desirably between about 1 second and about 100 seconds and preferably between about 10 seconds and about 40 seconds.

The objects of the present invention are preferably achieved by conducting the above-described portion of the present process in a direct-fired furnace reactor, preferably of the unpacked, vertical cylindrical shaft type. The furnace reactor can be constructed of any commonly used material capable of withstanding the operating conditions of the present process. Preferably, however, the reactor is constructed of stainless steel, particularly type 316-stainless steel. The mixture of potassium chloride and phosphoric acid is injected or sparged at or near the top of the furnace reactor by means of one or more conventional spraying or atomizing devices. In view of the fact that the reaction mixture is preferably injected into the reactor in the form of a slurry, it is advantageous to employ, as spraying device, one which comprises a high speed rotary disc of conventional design from which the reaction mixture is "sprayed off" by centrifugal force. Generally, the particle size of the injected mixture of reactants decreases with increasing disc speed. Also, the particle size for a given disc speed increases with increasing rate of feed into the reactor. The resulting particles are contacted with a hot, inert gas and are swept through the reactor in a cyclonic fashion, preferably in a downward direction. In this way the particles are exposed to a temperature of between about 250° C. and about 400° C., and preferably between about 300° C. and about 350° C. Desirably, the hot, inert gas is combustion gas, preferably derived from the burning of a hydrocarbon fuel, e.g., natural gas, in an air, oxygen, or like combustion-supporting atmosphere. Such combustion gas comprises mainly water and carbon dioxide. The rate of flow of combustion gas and the rate at which the potassium chloride-phosphoric acid mixture is injected into the furnace are adjusted so that the residence time of the reactants and products within the furnace at the aforementioned temperatures is maintained between about 1 second and about 100 seconds and preferably between about 10 seconds and about 40 seconds. The production of water-soluble potassium polyphosphates within the furnace reactor is essentially independent of pressure. Hence, subatmospheric, atmospheric, and superatmospheric pressures can be used within the reactor consistent with the other operating conditions constituting the process of the present invention.

The hydrogen chloride produced within the zone of elevated temperature is continuously separated from the potassium polyphosphate (which is generally in liquid form) and carried out of the side of the furnace, preferably near the bottom thereof along with spent combustion gas. The hydrogen chloride can be collected for disposal, e.g., in the form of hydrochloric acid, by cooling and contacting the spent combustion gas with water. Alternatively, the hydrogen chloride contained in the spent combustion gas can be disposed of by chemical reaction in situ. An especially preferred method of hydrogen chloride disposal by chemical means is described later hereinbelow. It is a feature of the present process that the complete consumption of potassium chloride and rapid separation of hydrogen chloride from the potassium polyphosphate product ensure that the latter will be free of chloride ion. The potassium polyphosphate product, together with unreacted phosphoric acid and potassium salt of phosphoric acid, accumulates at the bottom of the furnace as a liquid and can be continuously or intermittently withdrawn therefrom and quenched. The "residence time of the reactants and products within the furnace" mentioned hereinbefore includes also the time spent at the bottom of the reactor prior to withdrawal therefrom.

It is an important feature of the present process that the reaction temperature and retention time are adjusted to prevent any substantial conversion of the water-soluble potassium polyphosphates into water-insoluble metaphosphates. For this purpose, it has also been found advantageous to quickly quench the potassium polyphosphate product to lower temperatures where further reaction (i.e., formation of metaphosphates) does not occur. Desirably, the potassium polyphosphate product is quenched to a temperature of less than about 80 ° C., within a period of time of no more than about 60 seconds, preferably between about 1 second and about 60 seconds. Especially preferred is a quenching temperature of between about 40° C. and about 60° C., and a quenching time of between about 1 second and about 10 seconds.

Water can be advantageously used as the quenching medium, and the resultant aqueous solution of alkali metal polyphosphate is useful in the manufacture of high-analysis liquid fertilizers. The temperature of the aqueous quenching bath is maintained below about 80° C. and the acidity thereof is preferably kept near the neutral point to suppress hydrolysis of the potassium polyphosphates to phosphates. Desirably, the pH of the quenching bath is maintained between about 6.0 and about 7.0 and preferably between about 6.5 and 7.0. Aqueous base, e.g., potassium hydroxide can be advantageously used to buffer the quenching bath within the above-mentioned pH ranges. Ammonia is especially preferred for this purpose because it reacts with the phosphoric acid in the quenching bath to form ammonium phosphate, which is a nitrogen-containing soil fertilizer. Small amounts of insoluble iron and aluminum compounds, which are derived from the wet-process phosphoric acid feed, can be removed by filtration at this point. If relatively pure or partially purified phosphoric acid (e.g. solvent-extracted wet-process phosphoric acid) is employed as feed, no filtration is ordinarily required. When ammonia is used as the buffering agent, a typical product solution will contain between about 2 percent by weight and about 4 percent by weight nitrogen, between about 15 percent by weight and about 25 percent by weight $P_2O_5$, and between about 12 percent by weight and about 20 percent by weight $K_2O$. The present process can also be adapted to the production of solid potassium polyphosphates by employing cooled, solid, water-soluble potassium polyphosphates as the quenching medium, although in general, any cool, inert, heat transfer medium will suffice. As an advantageous alternative, the alkali metal polyphosphate product can be quenched in fertilizer vehicles, e.g., attapulgite clay, bentonite clay, kieselguhr, sand, and the like. In general, any inert or plant-nourishing material can be advantageously employed as a fertilizer vehicle.

Soil fertilizer material produced according to the process of the present invention (i.e., material withdrawn from the reactor) comprises mainly water-soluble potassium polyphosphates, together with unreacted phosphoric acid and potassium salt of phosphoric acid, both of which are water-soluble and plant nourishing. At least about 50 percent by weight and generally greater than about 60 percent by weight of the phosphorus content of the fertilizer material is in the form of potassium polyphosphates.

The present process has many advantages. For example, the process can be conducted as a continuous, steady-state operation under conditions which are essentially independent of the scale of the operation. The process of the present invention permits the production of water-soluble alkali metal polyphosphates while at the same time circumventing the difficulties heretofore associated with the handling of reactants and products which are generally sticky and difficult to manipulate when hot. Furthermore, since there is minimal contacting of hot reactants and products with solid surfaces of the apparatus, there is no need for frequent and costly shutdowns to permit cleaning of such surfaces. The process makes possible the continuous production of liquid fertilizer solutions having greater $M_2O$ and total plant food content than was heretofore commercially possible using wet-process phosphoric acid. The process provides a high-analysis polyphosphate fertilizer material capable of sequestering valuable (albeit insoluble) plant food nutrients (e.g., compounds of zinc, copper, and the like) in an aqueous medium. The process permits large scale, continuous production of a water-soluble plant nourishing material which is low in undesirable chloride ion content.

It is an important feature of this invention that the use, as quenching media, of liquid or solid soil fertilizers or soil fertilizer vehicles, in conjunction with the other novel aspects of the present process, provides a general method for the continuous conversion of alkali metal chlorides and phosphoric acid into material suitable for use directly as high analysis liquid or solid soil fertilizers within a single, coordinated manufacturing plant. Yet another feature derived from the advantages of the present invention is the novel concept of utilizing the hydrogen chloride contained in the effluent combustion gas to "acidulate" or treat phosphate rock under appropriate conditions to produce wet-process phosphoric acid. Such phosphoric acid, after suitable isolation and purification, can be employed as feed for reaction with potassium chloride in the manner hereinbefore described. Thus, a substantial part of the phosphoric acid required for the process of the present invention can be supplied from acidulation reactors operated in conjunction with the very same apparatus in which the phosphoric acid is to be employed. Such an arrangement provides in toto a coordinated process for producing high analysis, water-soluble potassium polyphosphate-containing soil fertilizers from potassium chloride and phosphate rock. Phosphoric acid from external sources is required only to the extent needed to makeup for mechanical and chemical losses.

The accompanying drawings are partially schematic diagrams (not necessarily drawn to scale) of preferred embodiments of the process of the present invention.

FIG. 1 depicts the production of high-analysis potassium polyphosphate liquid fertilizer solution.

FIG. 2 depicts the recovery of hydrogen chloride byproduct as hydrochloric acid.

Figure 3:
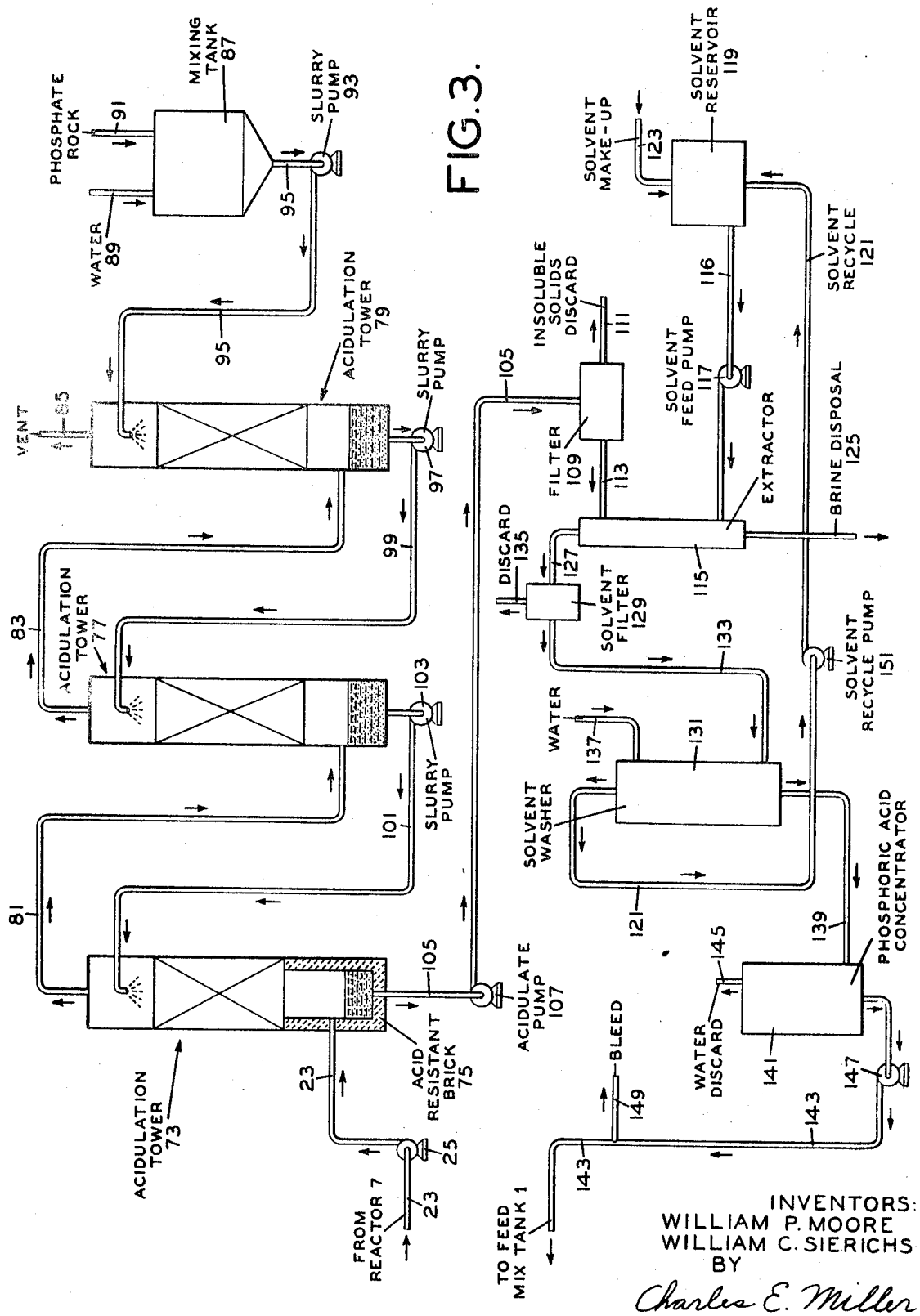
FIG. 3 depicts the use of hydrogen chloride byproduct to acidulate phosphate rock to produce phosphoric acid suitable for use as feed.

Referring particularly now to FIG. 1, potassium chloride and phosphoric acid are fed into conventional feed mix tank 1 through feed lines 3 and 5, respectively. Mixing is conducted within feed mix tank 1 at ambient temperature and the resulting slurry is conducted through line 9 with the aid of feed pump 11 to a direct-fired, unpacked, vertical, cylindrical furnace reactor 7. The mixture is sprayed into reactor 7 in the form of finely divided particles through conventional sparging means 13 which is positioned at the top of reactor 7 so that the particles are propelled in a generally downward direction. The elevated temperature within reactor 7 is provided by means of hot combustion gas originating from burner 15 and conducted into reactor 7 through line 17. Burner 15 is supplied with air and hydrocarbon fuel gas through lines 19 and 21, respectively. The finely divided particles of potassium chloride-phosphoric acid mixture travel concurrently with the combustion gas down the interior of reactor 7 in a spiral or cyclonic manner. The potassium polyphosphate product is removed as a liquid from the tapered bottom of reactor 7, where it can be allowed to accumulate as a pool, thereby acting as a seal to prevent passage of gases, notably hydrogen chloride, through the bottom of reactor 7. Alternative to the use of a pool of molten product at the bottom of reactor 7, any of several conventional methods for preventing the passage of hydrogen chloride-containing gas through the bottom of reactor 7 can be employed. For example, a negative pressure within reactor 7 relative to the pressure outside will effectively prevent the escape of gases from the bottom of reactor 7. The spent combustion gas, together with air and hydrogen chloride, are separated from the potassium polyphosphate in the lower portion of reactor 7 and are withdrawn therefrom through line 23 at a controlled rate with the aid of valve-blower pump 25 (shown in FIG. 2). Potassium polyphosphate product is withdrawn from the bottom of reactor 7 through line 43 and is transferred directly to quench chamber 45 wherein the potassium polyphosphate product is immediately quenched in water which is continually recycled as shown and described herein as follows. Aqueous potassium polyphosphate solution is withdrawn from quench chamber 45 through line 47 with the aid of pump 49 and transferred to cooler 51. Cooler 51 is preferably of a conventional tube-and-shell design with potassium polyphosphate solution being circulated through the tube side and coolant through the shell side. Ammonia is introduced (as a gas or aqueous solution) into line 47 through feed line 53 at a convenient point between quench chamber 45 and cooler 51. Valve 55 serves to regulate the amount of ammonia introduced into the circulating aqueous quenching solution. The solution is withdrawn from cooler 51 through line 57. Valve 59 divides the solution passing through line 57 into two parts: one part is transferred to holding tank 61 through line 63 (filter 65 is interposed between valve 59 and holding tank 61 to remove suspended solids); the other part is recycled to quench chamber 45 through line 67. Water is fed into quench chamber 45 through feed line 69 to compensate for volume losses due to withdrawal from circulation of solution diverted to holding tank 61. Aqueous potassium polyphosphate is withdrawn from holding tank 61 through line 71 for disposal or storage in a suitable container (not shown).

With reference to FIG. 2, spent combustion gas, together with air and hydrogen chloride, are separated from the potassium polyphosphate in the lower portion of reactor 7 and are withdrawn therefrom through line 23 at a controlled rate with the aid of valve-blower pump 25. One or more conventional separators (not shown) can, if desired, be interposed along line 23 to recover entrained solids and/or liquids. The gases are fed directly through line 23 to conventional scrubber 27 wherein they are cooled and partially condensed (i.e., "scrubbed") with water to form hydrochloric acid which is withdrawn from the bottom of scrubber 27 through line 29 with the aid of pump 31. Scrubber 27 is preferably lined with rubber or plastic and packed with polypropylene in a conventional gridlike fashion. At a point along line 29 downstream from pump 31 is located valve 33 which divides the stream of hydrochloric acid into 2 parts: one part is taken through line 34 for disposal or storage in a suitable container (not shown) and the other part is cooled in cooler 35 and recycled back to scrubber 27 through line 37. Cooler 35 is preferably of the same design as cooler 51, described earlier in connection with the discussion of FIG. 1. Water makeup is fed into scrubber 27 through feed line 39 and uncondensed gases are withdrawn through line 41 for disposal.

With reference to FIG. 3, spent combustion gas containing hydrogen chloride, which is produced in the manner described in connection with the discussion of FIG. 1, is used to acidulate phosphate rock to produce phosphoric acid which can be "recycled" back to feed mix tank 1. Spent combustion gas containing hydrogen chloride passing through line 23 is fed by valve-blower pump 25 into the lower portion of acidulate tower 73 lined with acid-resistant brick 75. The combustion gas generally contains less than about 10 percent by weight hydrogen chloride. Within acidulation tower 73, the gas is cooled to about 100° C. Prior to entering acidulation tower 73, the temperature of the spent combustion gas containing hydrogen chloride can be adjusted by means of a suitable, conventional heat exchanging means (not shown). The gas then flows through acidulation towers 73, 77, and 79 in series by entering the bottom of each tower and passing out the top. Line 81 serves to transport the gas from tower 73 to tower 77. Line 83 serves to transfer gas from tower 77 to tower 79. Generally, temperatures within the acidulation towers are preferably maintained between about 85° C. and about 110° C. The spent combustion gas, now depleted of hydrogen chloride, is removed from the top of tower 79 through vent 85. The upper portion of acidulation tower 73 and all of acidulation towers 77 and 79 are of rubber-lined carbon steel construction and are filled with an inert, solid absorption packing, e.g., polypropylene. The pressure within the towers is maintained essentially atmospheric.

Water and uncalcined phosphate rock are fed into mixing tank 87 through supply lines 89 and 91, respectively, which supply lines are provided with suitable control means (not shown) whereby the rates of flow of feed materials can be varied. The phosphate rock is preground so that preferably about 80 percent of the phosphate rock particles are smaller than about 45 U.S. mesh. The resulting slurry, which is preferably formulated to contain between about 10 percent and about 60 percent by weight of phosphate rock, is fed continuously by slurry pump 93 through line 95 to the top of acidulation tower 79. Slurry is then withdrawn from the bottom of tower 79 and fed by slurry pump 97 through line 99 to the top of tower 77 and then from the bottom of tower 77 to the top of tower 73 through line 101 by slurry pump 103. Acidulate liquor is withdrawn from the bottom of tower 73 through outlet duct 105 and pumped by acidulate pump 107 to acidulate filter 109, wherein insoluble material is separated and discarded through discard line 111.

Acidulate filter 109 is connected through line 113 to extractor 115, wherein the crude phosphoric acid solution is extracted with a water-immiscible, phosphoric acid-miscible solvent supplied to extractor 115 by solvent feed line 116 with the aid of solvent feed pump 117. Solvent is supplied to solvent reservoir 119 through solvent recycle line 121 and solvent makeup line 123. Illustrative of the water-immiscible, phosphoric acid-miscible solvents suitable for use in the present process are n-butanol, sec-butanol, aliphatic alcohols containing 5 carbon atoms, triethyl phosphate, and N,N-disubstituted organic amides derived from monocarboxylic amides having from 1 to 3 carbon atoms and N,N-dialkylamines whose alkyl groups contain 1 or 2 carbon atoms.

The brine raffinate formed in extractor 115 is withdrawn through line 125 for disposal.

The phosphoric acid-containing extract is removed from extractor 115 through line 127, filtered (if any solids are present) in solvent filter 129, and passed into solvent washer 131 through line 133, wherein the phosphoric acid is continuously extracted with water. Filtered solids (if present) are removed from solvent filter 129 through filter discard line 135. Water is supplied to solvent washer 131 by supply line 137.

Organic raffinate formed in solvent washer 131 is withdrawn through solvent recycle line 121 and returned to solvent reservoir 119 with the aid of solvent recycle pump 151. The phosphoric acid-containing aqueous phase formed in solvent washer 131 is passed through line 139 into phosphoric acid concentrator 141, wherein the phosphoric acid is freed of excess water and hydrochloric acid to give 80 percent phosphoric acid. Such separation of water from phosphoric acid may be performed by any of several methods known in the chemical art, for example, by distillation. The phosphoric acid thus purified is withdrawn through outlet duct 143. Water, which contains substantial amounts of hydrochloric acid, is removed through solvent discard line 145. This water can be used to contain requisite acidity within extractor 115. Phosphoric acid is transferred through outlet duct 143 with the aid of pump 147 to feed mix tank 1 and bleed line 149 as "solvent-extracted" wet-process phosphoric acid.

The following examples are presented for the purpose of illustrating (but not limiting) the process of the present invention with reference to the drawings.

Parts and percentages are by weight unless otherwise indicated.

Temperatures within the reactor chamber are determined by means of a conventional thermocouple or pyrometer.

Residence times are average values calculated form knowledge of the steady-state rates of input to and output from the reactor.

EXAMPLE 1

This example illustrates the ease with which complete reaction of potassium chloride is obtained according to the process of the present invention. Conditions specified herein are for continuous, steady-state operation.

Two hundred seventy-four parts per hour of finely ground potassium chloride (containing 62 percent $K_2O$ and about 1.7 percent $Na_2O$ as sodium chloride) and 640 parts per hour of wet-process phosphoric acid (containing 54 percent $P_2O_5$ and 3.5 percent iron and aluminum oxides) are added to a feed mix tank. These ingredients are blended within the feed mix tank at 30° C. to form a slurry. This slurry is continuously fed at the rate 914 parts per hour into the top of a spray-dryer type reactor and dispersed therein as fine droplets by means of a high speed rotary disc positioned at the op of the reactor chamber. The speed of rotation of the disc is adjusted to 7,800 revolutions per minute to give particles having a diameter of about 30 ± 10 microns. Simultaneously, combustion gas formed by burning natural gas in air is introduced at the top of the reactor. Combustion conditions are adjusted so that the combustion gas enters the reactor chamber at a temperature of about 500° C. This hot combustion gas is immediately cooled upon contact with droplets of potassium chloride-phosphoric acid mixture. As a result, the temperature of the reaction zone is about 300° C. uniformly throughout under steady-state conditions. The rate of flow of combustion gas is adjusted so that the time required for passage of the droplets through the reactor is about 15 seconds. Spent combustion gas (including about 5 percent hydrogen chloride byproduct) is continuously withdrawn near the bottom of the reactor, and the hydrogen chloride is separated by scrubbing with water. The product is withdrawn from the bottom of the reactor as a free-flowing liquid melt which is dropped directly into the quench chamber wherein the potassium polyphosphate is dissolved, cooled, and neutralized in a circulating aqueous solution of potassium polyphosphate. The pH of the solution is maintained at about 6.5 by the addition of appropriate amounts of aqueous ammonia. The quenching temperature is about 60° C. The quenching solution is cooled and filtered to afford a clear, light green solution and a solid filter cake comprising iron and aluminum impurities derived from the phosphoric acid feed. The solute analysis of the solution is as follows:

| COMPONENT | WEIGHT % |
| --- | --- |
| Nitrogen | 4.0 |
| Total $P_2O_5$ | 24.2 |
| Portion of $P_2O_5$ as polyphosphates | 51.0 |
| $K_2O$ | 13.0 |
| Chloride | 0.1 |

In this example, 82 percent of the phosphoric acid feed is converted to potassium phosphate product solution with 51 percent of the product $P_2O_5$ in the polyphosphate form. The potassium polyphosphates consist of about 90 percent pyrophosphate and 10 tripolyphosphate and higher polyphosphate species. Analysis of the product prior to quenching indicates the complete absence of potassium metaphosphates and 100 percent water and citrate solubility.

EXAMPLE 2

The procedure, operating conditions, and materials used are the same as in Example 1 except that a higher ratio of potassium chloride-to-phosphoric acid is used and slightly less ammonia is added to the quenching solution. Speed of the rotary disc is 5,000 revolutions per minute.

One hundred sixty-three parts per hour of finely ground potassium chloride and 250 parts per hour of wet-process phosphoric acid are blended in a feed mix tank at 30° C. The resulting slurry is treated in the manner described in Example 1. The filtered, clear aqueous solution of potassium polyphosphate product has the following solute analysis:

| Component | Weight % |
| --- | --- |
| Nitrogen | 2.9 |
| Total $P_2O_5$ | 22.0 |
| Portion of $P_2O_5$ as polyphosphates | 60.0 |
| $K_2O$ | 16.3 |
| Chloride | 0.6 |

In this example, 80 percent of the phosphoric acid feed is converted to potassium phosphate product solution with 60 percent of the product $P_2O_5$ in the polyphosphate form. The potassium polyphosphates in the liquid product are about 86 percent pyrophosphate and 14 percent in the tripolyphosphate and higher polyphosphate species. Analysis of the product prior to quenching indicates the complete absence of potassium metaphosphates and 100 percent water and citrate solubility.

EXAMPLE 3

This example illustrates the production of a high-concentration product using a relatively high potassium chloride-to-phosphoric acid feed ratio according to the present invention.

Two hundred seventy-eight parts per hour of finely ground potassium chloride (as in Example 1) are mixed with 400 parts per hour of wet-process phosphoric acid (as in Example 1) in the usual manner. The resulting slurry is sprayed at the top of a vertical furnace reactor in the manner provided in Example 1, except that the initial temperature of the combustion gases within the reactor chamber is adjusted to 600° C. and the speed of the rotary disc is 6,000 revolutions per minute. After 15 seconds residence time at 325° C., the molten potassium polyphosphate-containing product is dropped directly into a circulating quench solution at 60° C. Aqueous ammonia is added to the circulating aqueous product solution in amount sufficient to give a pH therein of 7.0. The solute analysis of the filtered solution is as follows:

| COMPONENT | WEIGHT % |
| --- | --- |
| Nitrogen | 5.1 |
| Total $P_2O_5$ | 29.3 |
| Portion of $P_2O_5$ as polyphosphates | 66.0 |
| $K_2O$ | 15.9 |
| Chloride | 0.4 |

In this example, the total plant food content of the solution is 50.3 percent, yet the "salting out" temperature is below 0° C. Of the $P_2O_5$ fed into the process as wet process phosphoric acid, 86.4 percent is converted to potassium phosphate product solution with 66.0 percent of the $P_2O_5$ in the polyphosphate form. The potassium polyphosphates in the liquid product are about 83 percent pyrophosphate and 17 percent tripolyphosphate and higher polyphosphate species. Analysis of the product prior to quenching indicates the complete absence of potassium metaphosphates and 100 percent water and citrate solubility.

EXAMPLE 4

This example illustrates a preferred embodiment of the present invention whereby the spent combustion gas containing byproduct hydrogen chloride is contacted with an aqueous slurry of phosphate rock to produce phosphoric acid for recycle in the overall process. A preferred procedure is described below using spent combustion gas which contains about 5 percent hydrogen chloride produced in the manner of Example 1.

The hydrogen chloride-containing combustion gas is contacted with phosphate rock to produce phosphoric acid in three acidulation towers. Each of the three acidulation towers has an interior diameter-to-height ratio of about 1:8. Aqueous phosphate rock slurry is prepared by mixing 485.8 parts per hour of water with 161.9 parts per hour of uncalcined phosphate rock in a mixing tank. The phosphate rock is preground to about 50 U.S. mesh and has the following composition:

| COMPONENT | WEIGHT % |
| --- | --- |
| $P_2O_5$ | 31.2 |
| CaO | 45.5 |
| $Al_2O_3$ | 1.7 |
| $Fe_2O_3$ | 0.5 |
| MgO | 0.3 |
| $(CO_3)^{12}$ | 3.35 |
| $F^1$ | 3.3 |
| organic carbon | 1.7 |
| $SiO_2$ | 7.8 |
| Other | 4.7 |

The aqueous phosphate rock slurry is fed continuously at the rate of 647.7 parts per hour to the top of the first acidulation tower with the aid of a slurry feed pump. Liquid is withdrawn from the bottom of the first tower and fed by a slurry pump to the top of the second tower and then from the bottom of the second tower by a slurry pump to the top of the third tower. Acidulate liquor containing a small amount of undissolved solids is withdrawn from the bottom of the third tower. The hydrogen chloride-containing combustion gas is flowed through the acidulation towers countercurrently to the direction of flow of the phosphate rock slurry by entering the bottom of each tower and passing out the top thereof. The hydrogen chloride-depleted combustion gas is discharged from the top of the first acidulation tower through a vent at the rate of 2,127.4 parts per hour and has the following analysis:

| COMPONENT | WEIGHT % |
| --- | --- |
| HCl | 0.1 |
| $CO_2$ | 12.2 |
| $N_2$ | 59.8 |
| $SiF_4$ | 0.1 |
| $H_2O$ | 27.7 |

The temperatures within the third, second, and first acidulation towers are maintained at 98° C., 94° C., and 91° C., respectively. Pressures within the acidulation towers are essentially atmospheric. Acidulate is withdrawn from the third tower at the rate of 786.8 parts per hour with analysis as follows:

| COMPONENT | WEIGHT % |
| --- | --- |
| $H_3PO_4$ | 8.8 |
| HCl | 0.6 |
| $CaCl_2$ | 18.6 |
| $SiF_4$ | 0.6 |
| $AlCl_3$ | 0.9 |
| $FeCl_3$ | 0.2 |
| $MgCl_2$ | 0.2 |
| $SiO_2$ | 1.1 |
| organic carbon | 0.3 |
| $H_2O$ | 65.8 |
| other | 2.9 |

The acidulate is pumped to an acidulate filter where water-insolubles are separated and disposed of at the rate of 28.3 parts per hour. The filtrate has the following analysis:

| COMPONENT | WEIGHT % |
| --- | --- |
| $H_3PO_4$ | 9.1 |
| $CaCl_2$ | 19.2 |
| HCl | 0.6 |
| organic carbon | 0.2 |
| $H_2O$ | 67.6 |
| $SiF_4$ | 0.5 |
| $AlCl_3$ | 0.9 |
| $FeCl_3$ | 0.2 |
| $MgCl_2$ | 0.2 |
| other | 1.4 |

The filtrate is transferred at the rate of 758.5 parts per hour to a conventional liquid-liquid extractor wherein phosphoric acid is separated from the filtrate by extraction with 900 parts per hour of isoamyl alcohol in the presence of hydrochloric acid recycled from the phosphoric acid concentration step, described below. The brine-containing raffinate is discarded. The alcoholic, phosphoric acid-containing extract phase is withdrawn from the extractor. The extract is then transferred to a solvent washer (a conventional liquid-liquid extractor) where it is washed with 550 parts per hour of water to form a dilute aqueous solution of phosphoric acid containing hydrogen chloride. The alcoholic raffinate is returned to a solvent reservoir. The dilute phosphoric acid solution is concentrated by evaporation to 80 percent $H_3PO_4$ to remove HCl, and excess water (and hydrogen chloride) are removed for disposal and/or recycle to the extractor. Purified phosphoric acid is withdrawn from the concentrator at the rate of 81.7 parts per hour with analysis as follows:

| COMPONENT | WEIGHT % |
| --- | --- |
| $H_3PO_4$ | 80.0 |
| $H_2O$ | 19.9 |
| $FeCl_3$ | 0.1 |
| $AlCl_3$ | trace |
| $SiF_4$ | trace |
| solvent | trace |

The yield of phosphoric acid (as $P_2O_5$) is 93.1 percent of theory based on phosphate rock and is suitable for use directly in the furnace reactor in the manner described by Examples 1–3.

The foregoing examples are presented for the purposes of illustrating the novel process of the present invention. It is of course understood that variations in the procedures described in those examples as well as changes in the materials used therein can be made without departing from the scope of the invention. Other advantages over the prior art, not disclosed herein, may also exist for this invention which is defined in the following claims.

We claim:

1. A continuous, steady-state process for producing a water-soluble potassium polyphosphate essentially free of metaphosphates and chloride ion, which comprises:
  a. forming a slurry mixture of potassium chloride and wet-process phosphoric acid having a $P_2O_5$ content between about 50 percent by weight and about 60 percent by weight and containing metallic impurities in amount less than about 5 percent by weight expressed as metal oxide, the mole ratio of the potassium chloride, expressed as metal oxide, to phosphoric acid, expressed as $P_2O_5$, in the mixture of potassium chloride and phosphoric acid being between about 0.75 and about 1.2;
  b. spraying the slurry mixture of potassium chloride and phosphoric acid in particulate slurry form into a combustion gas having a temperature of at least about 500° C. to heat the mixture to and maintain said mixture at a temperature of between about 250° C. and about 350° C., said sprayed particulate slurry mixture having particles which have a diameter of between about 20 micrometers and about 100 micrometers;
  c. maintaining the temperature of the sprayed particulate slurry mixture between about 250° C. and about 350° C. for a period of time between about 10 seconds and about 40 seconds to form hydrogen chloride and water-soluble potassium polyphosphate essentially free of metaphosphates and chloride ion;
  d. separating the water-soluble potassium polyphosphate from the combustion gas containing less than about 10 percent weight hydrogen chloride;
  e. cooling the water-soluble potassium polyphosphate obtained in step (d) to a temperature between about 20° C. and about 80° C. within a period of time between about 1 second and about 10 seconds, said cooling being conducted by contacting the water-soluble potassium polyphosphate with water maintained at a pH between about 6.0 and about 7.0 with ammonia, whereby water-soluble polyphosphate is obtained which is essentially free of metaphosphates and chloride ion;
  f. countercurrently contacting the combustion gas containing less than about 10 percent by weight hydrogen chloride obtained from step (d) with a flowing, aqueous slurry of phosphate rock particles, said slurry containing between about 10 percent and about 60 percent by weight of phosphate rock, about 80 percent of said phosphate rock particles being smaller than about 50 U.S. mesh;
  g. conducting step (f) at a temperature of between about 85° C. and about 110° C. at about atmospheric pressure, to produce a phosphoric acid-containing acidulate;
  h. withdrawing the phosphoric acid-containing acidulate obtained in step (g);
  i. extracting the acidulate withdrawn in step (h) with a phosphoric acid-miscible, calcium chloride brine-immiscible solvent selected from the group consisting of butanols and pentanols, to form a mutually immiscible calcium chloride-containing brine phase and a phosphoric acid-containing extract phase;
  j. separating the extract phase from the calcium chloride-containing brine phase;
  k. separating the phosphoric acid from said extract phase whereby a raffinate is formed, said raffinate being recycled as phosphoric acid-miscible, calcium chloride brine-immiscible solvent to step (i); and
  l. recycling the phosphoric acid obtained in step (k) to step (a) as phosphoric acid feed, thereby providing substantially all phosphoric acid required in the process.

2. A process as claimed in claim 1 wherein the mixture of potassium chloride and phosphoric acid in step (b) is heated to and maintained at a temperature of about 300° C. for about 15 seconds.